W. G. ZETSCHE.

FURNACE.

APPLICATION FILED MAR. 15, 1920.

Reissued Dec. 14, 1920.

15,009.

2 SHEETS—SHEET 1.

Witness:
Ed. G. Norson

Inventor
William G. Zetsche
By Walter M. Fuller
Atty

W. G. ZETSCHE.

FURNACE.

APPLICATION FILED MAR. 15, 1920.

Reissued Dec. 14, 1920.

15,009.

2 SHEETS—SHEET 2.

Witness:
Geo. C. Benson

Inventor
William G. Zetsche
By Walter M. Fuller
Atty

UNITED STATES PATENT OFFICE.

WILLIAM G. ZETSCHE, OF CHICAGO, ILLINOIS.

FURNACE.

15,009. Specification of Reissued Letters Patent. Reissued Dec. 14, 1920.

Original No. 1,322,214, dated November 18, 1919, Serial No. 279,803, filed February 28, 1919. Application for reissue filed March 15, 1920. Serial No. 366,068.

*To all whom it may concern:*

Be it known that I, WILLIAM G. ZETSCHE, a citizen of the United States, residing at Chicago, in the county of Cook and State of Illinois, have invented certain new and useful Improvements in Furnaces, of which the following is a specification.

This invention has for its object to provide an improved furnace having a plurality of muffles or hearths mounted therein for the heat treatment of metals, and in which the temperature of the several muffles or hearths may be readily regulated as needed to produce the desired results.

The particular purpose or aim of the invention is the provision of a furnace of this character in which the series of muffles or hearths will be subjected in sequence or succession to the heat developed from a single source of supply, although this may comprise a plurality of burners, with means for governing or controlling the temperature to which the muffles or hearths will be subjected, as by regulating the escape between them of a portion of the products of combustion, the heat of which discharged gases will not, therefore, be imposed on the succeeding muffles of the group or series.

A further object of the invention is the production of a furnace of this kind capable of easy control by the operator, and which may be maintained continuously in operation with resulting economy of time, fuel, and labor.

The invention consists in the features of construction and combinations of parts hereinafter fully described and particularly claimed.

In the accompanying drawings illustrating a suitable embodiment of the invention:

Figure 1:
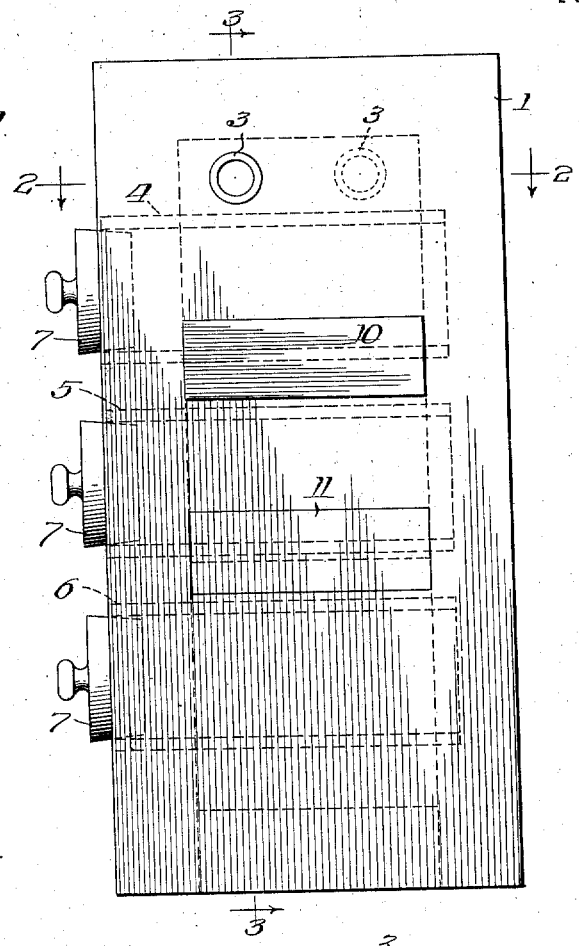
Figure 1 is a view in side elevation of a muffle-furnace constructed in accordance with the invention.
Figure 2:
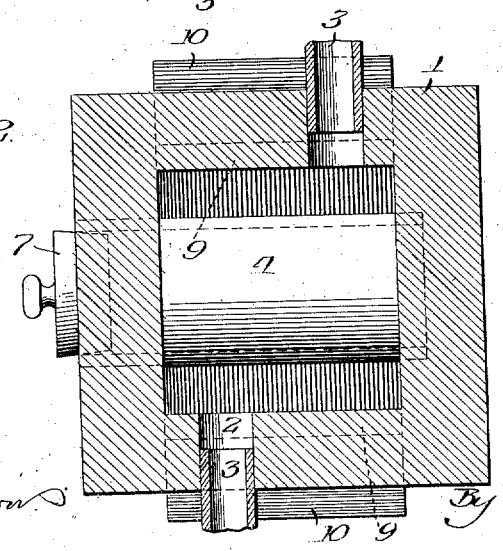
Fig. 2 is a plan section of the same on line 2—2 of Fig. 1.
Figure 3:
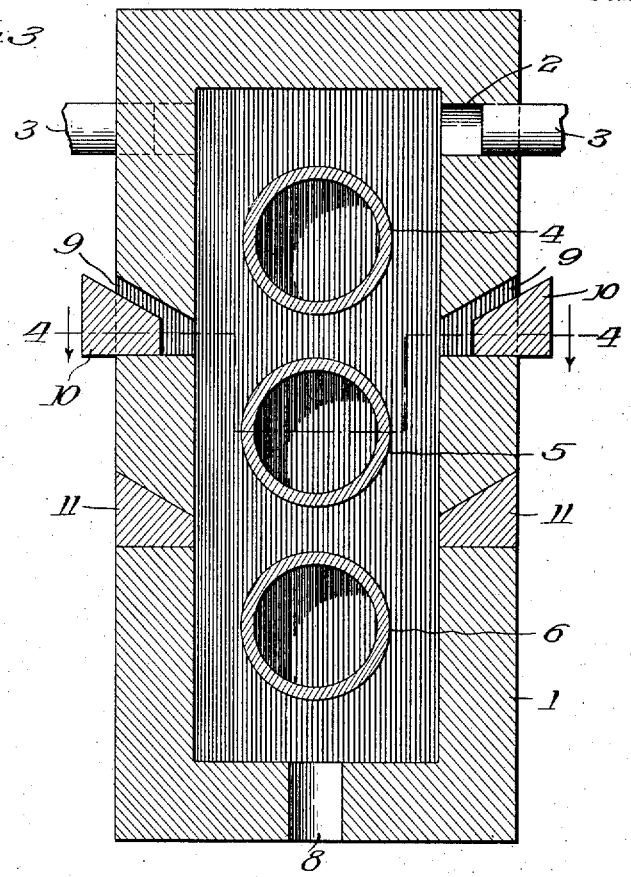
Fig. 3 is a vertical section of the same on line 3—3 of Fig. 1.
Figure 4:
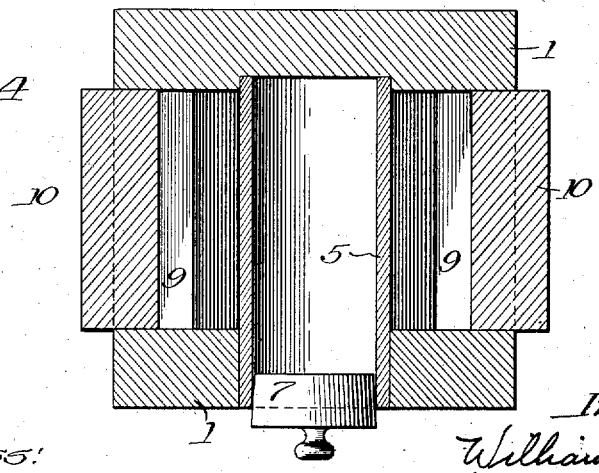
Fig. 4 is a plan section on the line 4—4 of Fig. 3.

My invention relates particularly to that class of furnaces which are adapted to be heated by gas or other fluid fuel. To this end it comprises the housing 1 of fire-brick or other suitable material which is preferably rectangular in vertical and plan sections, the side-walls of the furnace or housing being provided at their upper ends with non-registering openings 2, 2 into which the fuel supply-pipes 3, 3 project, the latter being preferably connected with a source of supply of air and a fuel, such as gas, coal-dust, or other fuel, or hot products of combustion. These openings 2, 2 and their pipes 3, 3 are laterally offset from one another whereby the flames issuing therefrom will not be opposed to one another.

A plurality or upright row of horizontal cylindrical muffles 4, 5 and 6 spaced apart vertically are located inside of such housing or compartment and span the space between its front and rear walls, the back ends of such muffles being accommodated in cavities or recesses in the inner face of the rear wall, the front portions of the muffles extending through apertures in the front wall of the housing and having removable plugs or closures 7.

Such muffles being disposed at respectively different elevations and spaced away from the side-walls of the housing are adapted to be successively heated by the downward passage of the hot gases from the top of the housing to the bottom thereof, from which they are exhausted or discharged through an opening 8.

At points substantially midway between the upper muffle 4 and the next lower muffle 5, the side-walls are provided with openings 9, 9 adapted to be more or less closed by adjustable plugs or closures 10, 10 and similar apertures, provided with like plugs or gates 11, 11 are located in the side-walls about midway between the intermediate muffle 5 and the lower muffle 6, all of such muffles being made of suitable heat-resisting or refractory material adapted to the purpose.

In practice, assuming that the fuel is burning in the top of the housing at the openings 2, 2 and that the gaseous products of combustion are flowing down around the muffles and discharging through the aperture 8, the material or body to be heated is first placed in the lowermost muffle 6 which is subjected to the least amount of heat and hence is at the lowest temperature of the three.

After having remained in such muffle a proper period of time the material or body is removed therefrom and introduced into the middle muffle where it is under the influence of a higher degree of temperature. After having remained in such muffle for an adequate period the material or body is taken out and deposited in the upper or hottest muffle and permitted to remain therein the required period, after which it is removed.

It will be understood that all three muffles would ordinarily be filled with the material or bodies so that all three are in service at the same time, and when the contents of the upper muffle are removed those of the intermediate one are shifted to the upper one, and also at the same time the contents of the lower muffle are placed in the middle one. Thus, the muffles are successively emptied and refilled, hence gradually increasing the temperature of the material undergoing treatment and producing a relatively continuous supply of the product.

The temperature of the top muffle may be readily controlled by varying the amount of fuel burned, that of the middle muffle may be easily governed by permitting an escape or discharge through the openings 9, 9 of a portion of the products of combustion before they reach such intermediate muffle, and, in similar manner, the temperature of the lower muffle may be regulated or controlled by the positions of the plugs 11, 11 thereby opening to a more or less degree the ports or apertures in which they fit.

Obviously, the number of muffles or hearths disposed in the housing and the number of openings controlled by the plugs or gates 10 and 11 may be changed and varied to accommodate the device to the needs of each installation. Other structural changes may be incorporated for similar reasons without departing from the invention as defined in the appended claims.

I claim:

1. A furnace of the character described, comprising in combination, a housing, means to burn fuel in the top portion of said housing, the latter having a discharge opening in its lower portion for the escape of the heated combustion gases, a plurality of muffles in said housing at different elevations, and spaced away from one another between said burner means and said discharge opening, and adjustable means for permitting the escape of a portion of the heated combustion gases, through the housing walls between said muffles, substantially as described.

2. A furnace of the character described, comprising in combination, a housing having connection at its upper end with a source of supply of fluid fuel under pressure and provided in its lower end with a discharge opening for products of combustion, a plurality of muffles spanning the interior of the housing at different elevations, there being openings in the walls of the housing at elevations alternating with and disposed substantially in staggered relation to said openings, substantially as described.

3. A furnace of the character described, comprising in combination, a housing having in opposite walls of one end thereof fuel feed openings offset with relation to one another and an outlet at its other end for the products of combustion, a plurality of muffles mounted at their ends in opposite walls of the housing and spanning the space between said fuel feed and discharge openings and adapted to be heated successively by the hot products of combustion as the latter flow through said housing, said muffles being spaced from each other and each having an end exposed exteriorly of the furnace, means for closing said exposed ends, and valve-controlled ports in the walls of the housing for permitting the escape of a portion of the hot gases of combustion for regulating the temperature of the muffles, substantially as described.

WILLIAM G. ZETSCHE.